(12) United States Patent
Honda et al.

(10) Patent No.: US 8,641,131 B2
(45) Date of Patent: Feb. 4, 2014

(54) FRAME STRUCTURE FOR VEHICLE

(75) Inventors: Masanori Honda, Hiroshima (JP);
Chikara Kawamura, Hiroshima (JP);
Shin Sasaki, Hiroshima (JP); Chikara Tanaka, Hiroshima (JP); Yushi Matsuda, Hiroshima (JP); Yukinori Nakajima, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 99 days.

(21) Appl. No.: 13/281,088

(22) Filed: Oct. 25, 2011

(65) Prior Publication Data

US 2012/0119546 A1 May 17, 2012

(30) Foreign Application Priority Data

Nov. 11, 2010 (JP) ................................ 2010-252973

(51) Int. Cl.
*B60R 19/18* (2006.01)
(52) U.S. Cl.
USPC ................................ 296/187.12; 296/203.03
(58) Field of Classification Search
USPC ............... 293/120, 132; 296/187.05, 187.12, 296/203.03, 205, 209, 193.05, 193.06
See application file for complete search history.

(56) References Cited

U.S. PATENT DOCUMENTS

| | | | | |
|---|---|---|---|---|
| 2,597,837 A | * | 5/1952 | Lindsay | 296/181.4 |
| 4,542,925 A | * | 9/1985 | Huber et al. | 293/120 |
| 5,462,144 A | * | 10/1995 | Guardiola et al. | 188/377 |
| 5,613,727 A | * | 3/1997 | Yamazaki | 296/203.03 |
| 5,941,597 A | * | 8/1999 | Horiuchi et al. | 296/203.01 |
| 5,975,623 A | * | 11/1999 | Shikimachi et al. | 296/187.05 |
| 6,126,232 A | * | 10/2000 | Nakano | 296/210 |
| 6,145,921 A | * | 11/2000 | Cho | 296/187.05 |
| 6,406,079 B2 | * | 6/2002 | Tamada et al. | 293/120 |
| 6,467,834 B1 | * | 10/2002 | Barz et al. | 296/187.02 |
| 6,478,367 B2 | * | 11/2002 | Ishikawa | 296/203.03 |

(Continued)

FOREIGN PATENT DOCUMENTS

DE 100 03 878 A1 8/2001
DE 103 15 056 A1 10/2003

(Continued)

OTHER PUBLICATIONS

The translation of the Office Action issued by the German Patent and Trade Mark Office on Feb. 15, 2013, which corresponds to DE Patent Application No. 10 2011 117 951.1 and is related to U.S. Appl. No. 13/281,088.

*Primary Examiner* — Glenn Dayoan
*Assistant Examiner* — Paul Chenevert
(74) *Attorney, Agent, or Firm* — Studebaker & Brackett PC (57) ABSTRACT

In a frame structure for a vehicle having a reinforcement body provided inside a frame body, the frame body comprises a first face portion and a second face portion extending in a direction substantially perpendicular to a rotational-axis direction of a bending moment occurring when a torsional load acts on a vehicle body, and third face portions positioned between the first and second face portions, and the reinforcement body comprises third-face connection portions connected to the third face portions, a first-face connection portion connected to the first face portion at a corner portion, a first-face non-contact portion provided away from the first face portion, a second-face connection portion connected to the second face portion at a corner portion, and a second-face non-contact portion provided away from the second face portion.

4 Claims, 7 Drawing Sheets

(56) References Cited

U.S. PATENT DOCUMENTS

| | | | | |
|---|---|---|---|---|
| 6,546,693 | B2 * | 4/2003 | Wycech | 52/790.1 |
| 6,607,239 | B1 * | 8/2003 | Fuji | 296/203.03 |
| 6,669,252 | B2 * | 12/2003 | Roussel et al. | 293/120 |
| 6,777,049 | B2 * | 8/2004 | Sheldon et al. | 428/35.8 |
| 6,817,654 | B2 * | 11/2004 | Kitagawa et al. | 296/187.03 |
| 6,854,795 | B2 * | 2/2005 | Yamazaki et al. | 296/209 |
| 6,932,421 | B2 * | 8/2005 | Barz | 296/187.02 |
| 7,147,258 | B2 * | 12/2006 | Evans et al. | 293/120 |
| 7,226,097 | B2 * | 6/2007 | Adachi et al. | 293/120 |
| 7,328,928 | B2 * | 2/2008 | Aizawa et al. | 296/24.4 |
| 7,510,234 | B2 * | 3/2009 | Ameloot et al. | 296/187.12 |
| 7,516,993 | B2 * | 4/2009 | Bouchez et al. | 293/120 |
| 7,735,906 | B2 * | 6/2010 | Takahashi et al. | 296/193.06 |
| 7,926,867 | B2 * | 4/2011 | Kochert et al. | 296/187.02 |
| 7,959,197 | B2 * | 6/2011 | Agrahari et al. | 293/102 |
| 7,963,588 | B2 * | 6/2011 | Kanagai et al. | 296/187.12 |
| 8,066,322 | B2 * | 11/2011 | Mori | 296/187.03 |
| 8,113,572 | B2 * | 2/2012 | Mildner et al. | 296/209 |
| 8,177,292 | B1 * | 5/2012 | Baccouche et al. | 296/193.06 |
| 8,393,672 | B2 * | 3/2013 | Mori | 296/193.06 |
| 2003/0042759 | A1 * | 3/2003 | Ori et al. | 296/188 |
| 2003/0090129 | A1 * | 5/2003 | Riley et al. | 296/203.03 |
| 2003/0184126 | A1 | 10/2003 | Yamazaki et al. | |
| 2006/0005503 | A1 * | 1/2006 | Bladow et al. | 52/735.1 |
| 2010/0207426 | A1 * | 8/2010 | Tsuruta et al. | 296/187.12 |
| 2010/0308607 | A1 * | 12/2010 | Ginja | 293/132 |
| 2011/0101714 | A1 * | 5/2011 | Bator | 293/132 |
| 2011/0156414 | A1 * | 6/2011 | Gonin et al. | 293/132 |
| 2011/0175399 | A1 * | 7/2011 | Nakano | 296/193.05 |

FOREIGN PATENT DOCUMENTS

| | | | | |
|---|---|---|---|---|
| DE | 10 2004 033 971 A1 | | 2/2006 | |
| DE | 10 2005 044 820 A1 | | 4/2007 | |
| EP | 622289 A1 | * | 11/1994 | B62D 23/00 |
| FR | 2536711 A1 | * | 6/1984 | B60R 21/02 |
| JP | H4-067190 U | | 6/1992 | |
| JP | 04218445 A | * | 8/1992 | B60R 19/03 |
| JP | 08268077 A | * | 10/1996 | B60J 5/10 |
| JP | 2010143461 A | * | 7/2010 | B62D 25/04 |

* cited by examiner

FRAME STRUCTURE FOR VEHICLE

BACKGROUND OF THE INVENTION

The present invention relates to a frame structure for a vehicle, which constitutes part of a vehicle body and in which a reinforcement body to reinforce a frame body is provided inside the frame body which is formed to have a closed cross section.

A frame for a vehicle (a vehicle-body frame), such as a side sill or a pillar which constitute part of a vehicle body of the vehicle, such as automotive vehicles, is generally formed to have a closed cross section. It is also known that a reinforcement body is provided inside a frame body formed to have a closed cross section to reinforce the frame body. Japanese Utility Model Laid-Open Publication No. H4-067190, for example, discloses a structure in which a pipe-shaped reinforcement body which has a contour corresponding to a shape of an inner face of a side sill is fixed inside the side sill via an adhesive.

However, in a case in which the frame body is reinforced with the reinforcement body attached inside the frame body having the closed cross section as disclosed in the above-described patent publication, a weight increase may be improperly caused by the reinforcement body. Accordingly, it has been an important problem how to properly reinforce the vehicle-body frame, such as the side sill or the pillar, restraining the weight increase.

Meanwhile, in the vehicle, such as automotive vehicles, it has been desired that a torsional rigidity of the vehicle body is increased from view points of improving the vehicle's maneuverability-and-stability and/or the vehicle's ride. This is because an increase of the torsional rigidity of the vehicle body can properly restrain a bending deformation of the vehicle-body frame even in a case in which a torsional load which may be inputted to the vehicle body through attachment portions of a suspension device of wheels to the vehicle body during a vehicle traveling is transmitted to the vehicle-body frame, such as the side sill or the pillar, thereby generating a bending moment at the vehicle-body frame.

SUMMARY OF THE INVENTION

An object of the present invention is to provide a frame structure for a vehicle which can increase the torsional rigidity of the vehicle body, restraining the weight increase.

According to the present invention, there is provided a frame structure for a vehicle which constitutes part of a vehicle body, comprising a frame body formed to have a closed cross section, and a reinforcement body provided inside the frame body to reinforce the frame body, wherein the frame body comprises a first face portion and a second face portion which are provided away from each other and extend in a direction substantially perpendicular to a rotational-axis direction of a bending moment which occurs at the frame body when a torsional load acts on the vehicle body, and third face portions which are positioned between the first face portion and the second face portion and form corner portions together with the first face portion and the second face portion, and the reinforcement body comprises third-face connection portions which are provided along the third face portions of the frame body and connected to the third face portions, a first-face connection portion which is provided continuously from the third-face connection portion and connected to the first face portion of the frame body at the corner portion between the third face portion and the first face portion of the frame body, a first-face non-contact portion which is provided away from the first face portion of the frame body, a second-face connection portion which is provided continuously from the third-face connection portion and connected to the second face portion of the frame body at the corner portion between the third face portion and the second face portion of the frame body, and a second-face non-contact portion which is provided away from the second face portion of the frame body.

According to the present invention, the third face portions positioned between the first face portion and the second face portion of the frame body which extend in the direction substantially perpendicular to the rotational-axis direction of the bending moment occurring at the frame body when the torsional load acts on the vehicle body, the vicinity of the corner potions between the first face portion and the third face portions, and the vicinity of the corner portions between the second face portion and the third face portions can be effectively reinforced. Accordingly, when the torsional rigidity acts on the vehicle body, the bending deformation of the frame body can be restrained and the torsional rigidity of the vehicle body can be increased, restraining the weight increase.

According to an embodiment of the present invention, the first-face connection portion of the reinforcement body is comprised of plural portions which are provided away from each other in a longitudinal direction of the frame body, and the second-face connection portion of the reinforcement body is comprised of plural portions which are provided away from each other in the longitudinal direction of the frame body. Thereby, compared with a case in which the first-face connection portion and the second-face connection portion are provided continuously in the longitudinal direction of the frame body, the weight increase can be restrained further, so that the above-described effects can be provided more effectively.

According to another embodiment of the present invention, the reinforcement body comprises a first first-face connection portion which is connected to the first face portion of the frame body at the corner portion between one of the third face portions and the first face portion of the frame body, a second first-face connection portion which is connected to the first face portion of the frame body at the corner portion between the other of the third face portions and the first face portion of the frame body, a first second-face connection portion which is connected to the second face portion of the frame body at the corner portion between one of the third face portions and the second face portion of the frame body, and a second second-face connection portion which is connected to the second face portion of the frame body at the corner portion between the other of the third face portions and the second face portion of the frame body, the first first-face connection portion and the second first-face connection portion are provided not to overlap each other in a longitudinal direction of the frame body, and the first second-face connection portion and the second second-face connection portion are provided not to overlap each other in the longitudinal direction of the frame body. Thereby, since the first first-face connection portion and the second first-face connection portion are provided not to overlap each other in the longitudinal direction of the frame body and the first second-face connection portion and the second second-face connection portion are provided not to overlap each other in the longitudinal direction of the frame body, the above-described effects can be provided more concretely.

According to another embodiment of the present invention, the reinforcement body is configured such that the first-face connection portion is not connected to the second face portion of the frame body in an area where the first-face connection portion is projected to the second face portion of the frame body in the rotational-axis direction of the bending moment and the second-face connection portion is not connected to the first face portion of the frame body in an area where the second-face connection portion is projected to the first face portion of the frame body in the rotational-axis direction of the bending moment. Thereby, the above-described effects can be provided more concretely.

According to another embodiment of the present invention, the reinforcement body comprises a S-shaped portion which is formed by a first third-face connection portion which is connected to one of the third face portions of the frame body, a first first-face connection portion which is connected to the first face portion of the frame body at the corner portion between the one of the third face portions and the first face portion of the frame body, a second third-face connection portion which is connected to the other of the third face portions of the frame body, a second second-face connection portion which is connected to the second face portion of the frame body at the corner portion between the other of the third face portions and the second face portion of the frame body, and a first connection portion connecting the first first-face connection portion and the second second-face connection portion, in a S shape in a section perpendicular to a longitudinal direction of the frame body, a reverse S-shaped portion which is formed by the first third-face connection portion, a first second-face connection portion which is connected to the second face portion of the frame body at the corner portion between the one of the third face portions and the second face portion of the frame body, the second third-face connection portion, a second first-face connection portion which is connected to the first face portion of the frame body at the corner portion between the other of the third face portions and the first face portion of the frame body, and a second connection portion connecting the first second-face connection portion and the second first-face connection portion, in a reverse-S shape in the section perpendicular to the longitudinal direction of the frame body, and a partition-wall portion which extends in a sectional direction perpendicular to the longitudinal direction of the frame body, the S-shaped portion and the reverse S-shaped portion being arranged one after the other in the longitudinal direction of the frame body via the partition-wall potion. Thereby, the bending deformation of the frame body can be further restrained when the torsional load acts on the vehicle body, so that the above-described effects can be provided more effectively.

According to another embodiment of the present invention, the first connection portion is configured such that a distance between the first connection potion and the first third-face connection portion becomes greater toward the second face portion from the first face portion of the frame body and a distance between the first connection potion and the second third-face connection portion becomes greater toward the first face portion from the second face portion of the frame body, and the second connection portion is configured such that a distance between the second connection potion and the first third-face connection portion becomes greater toward the first face portion from the second face portion of the frame body and a distance between the second connection potion and the second third-face connection portion becomes greater toward the second face portion from the first face portion of the frame body. Thereby, in a case in which the reinforcement body is formed with a forming mold through an injection molding, for example, the mold removing can be conducted easily and the above-described effects can be provided more effectively.

According to another embodiment of the present invention, the first face portion and the second face portion of the frame body constitute both side face portions which extend in a direction perpendicular to a vehicle width direction of a side sill, and the third face portions of the frame body constitute an upper face portion and a lower face portion of the side sill. Thereby, the upper face portion and the lower face portion of the side sill, the vicinity of the corners between the both side face portions and the upper face portion of the side sill, and the vicinity of the both side face portions and the lower face portion of the side sill can be reinforced effectively, so that the bending deformation of the side sill can be restrained when the torsional load acts on the vehicle body. Accordingly, the torsional rigidity of the vehicle body can be increased, restraining the weight increase.

According to another embodiment of the present invention, the first face portion and the second face portion of the frame body constitute both side face portions which extend in a direction perpendicular to a vehicle width direction of a pillar which extends in a vertical direction of the vehicle body, and the third face portions of the frame body constitute a front face portion and a rear face potion of the pillar. Thereby, the rear face portion and the front face portion of the pillar, the vicinity of the corners between the both side face portions and the rear face portion of the pillar, and the vicinity of the both side face portions and the front face portion of the side sill can be reinforced effectively, so that the bending deformation of the pillar can be restrained when the torsional load acts on the vehicle body. Accordingly, the torsional rigidity of the vehicle body can be increased, restraining the weight increase.

Other features, aspects, and advantages of the present invention will become apparent from the following description which refers to the accompanying drawings.

DETAILED DESCRIPTION OF THE INVENTION

Hereinafter, preferred embodiments of the present invention will be descried referring to the accompanying drawings. While some specific terms of "upper," "lower," "right," or "left" and other terms containing these specific terms and directed to a specific direction will be used, the purpose of usage of these terms or words is merely to facilitate understanding of the present invention referring to the drawings. Accordingly, it should be noted that the meanings of these terms or words should not improperly limit the technical scope of the present invention.

The inventors of the present patent application and others conducted a structure optimization analysis of a connection portion of a reinforcement body to a frame body for a case in which a torsional load acts on a vehicle body equipped with a side sill which comprises a frame body having a substantially-rectangular closed cross section and a reinforcement body provided inside the frame body, in developing a frame structure for a vehicle which can increase the torsional rigidity of the vehicle body, restraining a weight increase.

As a result, they found that a bending moment occurs at the side sill such that a rotational-axis direction of the bending moment matches a vehicle width direction when the torsional load acts on the vehicle body, and configuring such that the reinforcement body is connected to an upper face portion and a lower face portion of the frame body, which are positioned between both side portions of the frame body which extend in a direction substantially perpendicular to the rotational-axis direction of the bending moment, contributes the most a restraint of the bending deformation of the side sill and an increase of the torsional rigidity of the vehicle body. Further, they found that configuring such that the reinforcement body is connected to the both side portions in the vicinity of corner portions formed between the both side portions and the upper face portion or the lower portion of the frame body contributes greatly the restraint of the bending deformation of the side sill and the increase of the torsional rigidity of the vehicle body as well.

From the above-described analysis results, it may be considered that the bending deformation of the side sill can be restrained and the torsional rigidity of the vehicle body can be increased by configuring such that the reinforcement body is connected to third face portions (the upper face portion and the lower face portion) which are positioned between the first face portion and the second face portion (the both side face portions) of the frame body, which are provided away from each other and extend in a direction substantially perpendicular to the rotational-axis direction of the bending moment, and form corner portions together with the first face portion and the second face portion, and configuring such that the reinforcement body is connected to the first face portion and the second face portion at the corner portions between the third face portions and the first face portion or the second face portion of the frame body.

Figure 1:
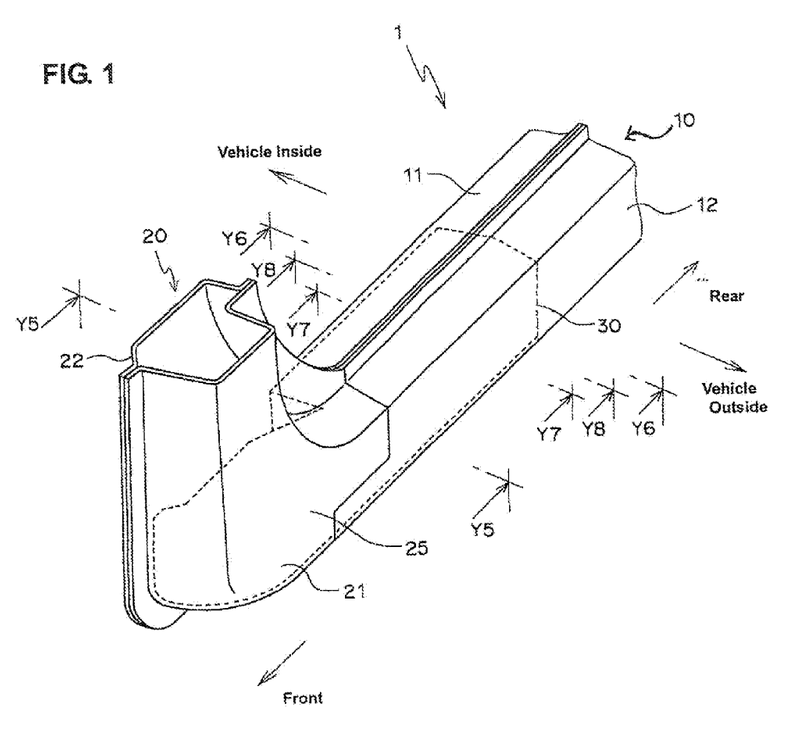
FIG. 1 is a perspective view showing a side sill to which a frame structure for a vehicle according to an embodiment of the present invention is applied.
Figure 2:
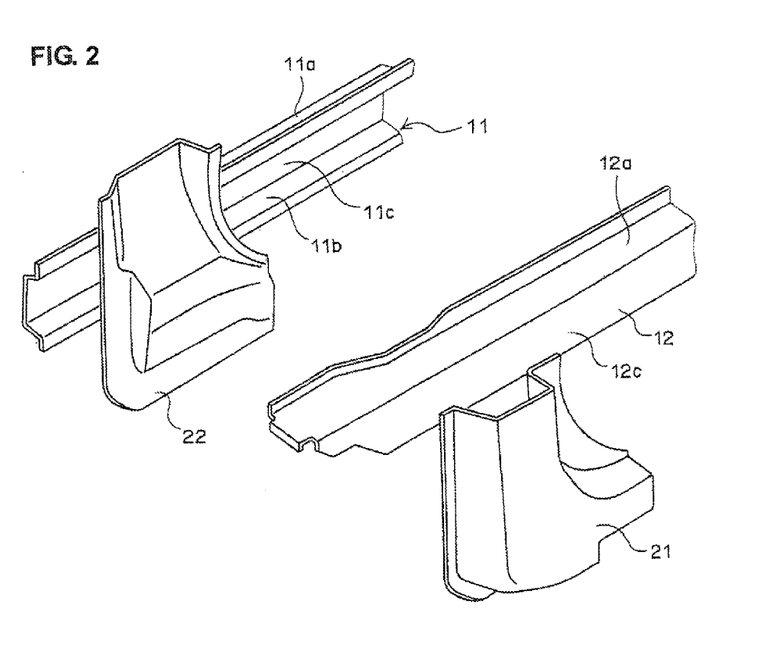
FIG. 2 is an exploded perspective view of the side sill shown in FIG. 1.
Figure 3:
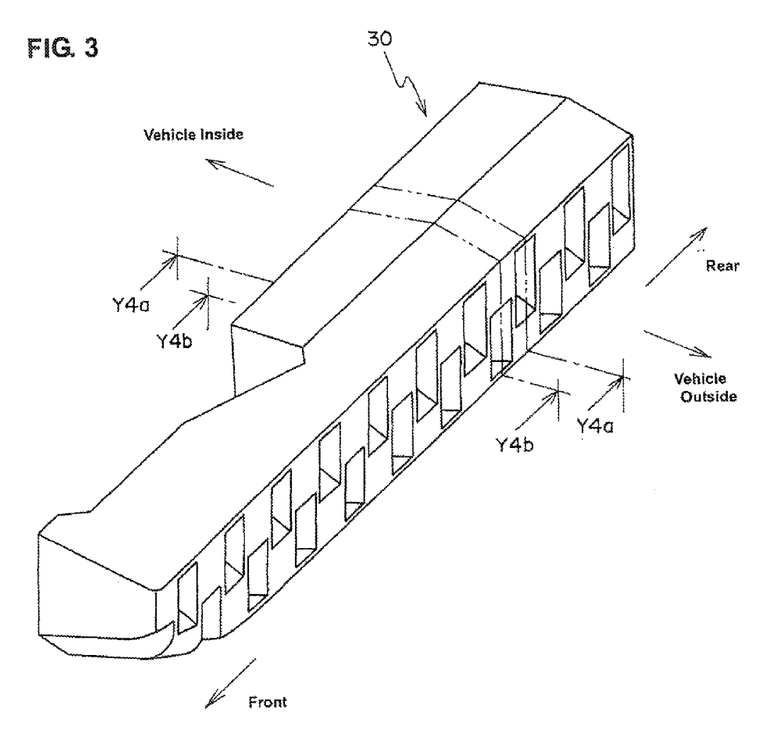
FIG. 3 is a perspective view showing a reinforcement body provided inside the side sill shown in FIG. 1.
Figure 4A:
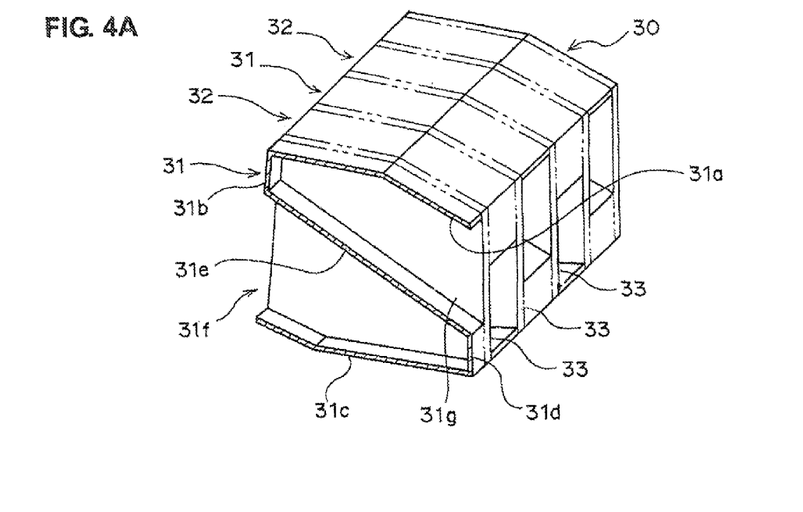
FIGS. 4A and 4B are sectional views of the reinforcement body shown in FIG. 3, taken along lines Y4a-Y4a and Y4b-Y4b, respectively.
Figure 4B:
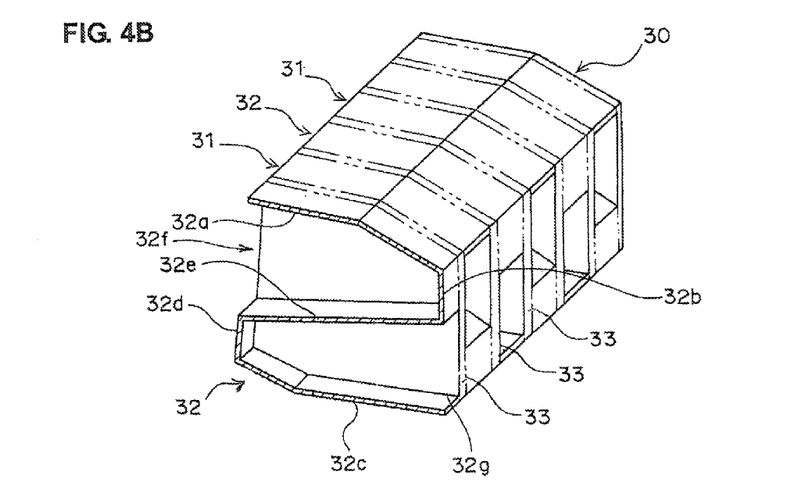
Figure 5:
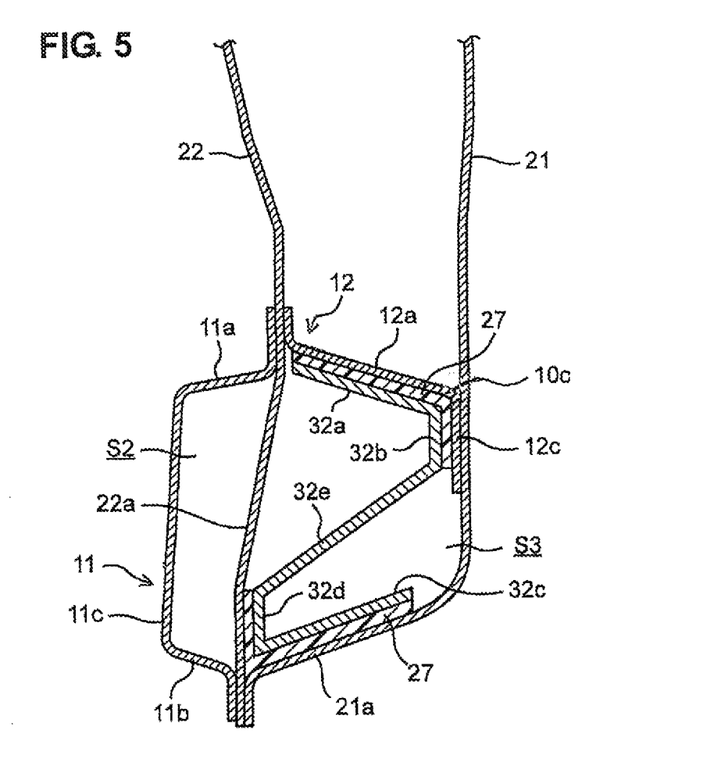
FIG. 5 is a sectional view taken along line Y5-Y5 of FIG. 1.
Figure 6:
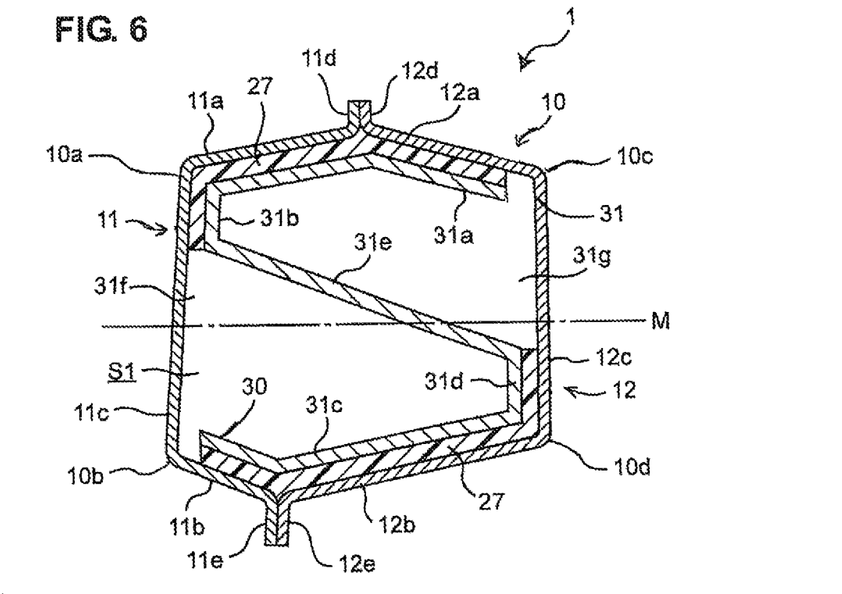
FIG. 6 is a sectional view of the side sill, taken along line Y6-Y6 of FIG. 1.
Figure 7:
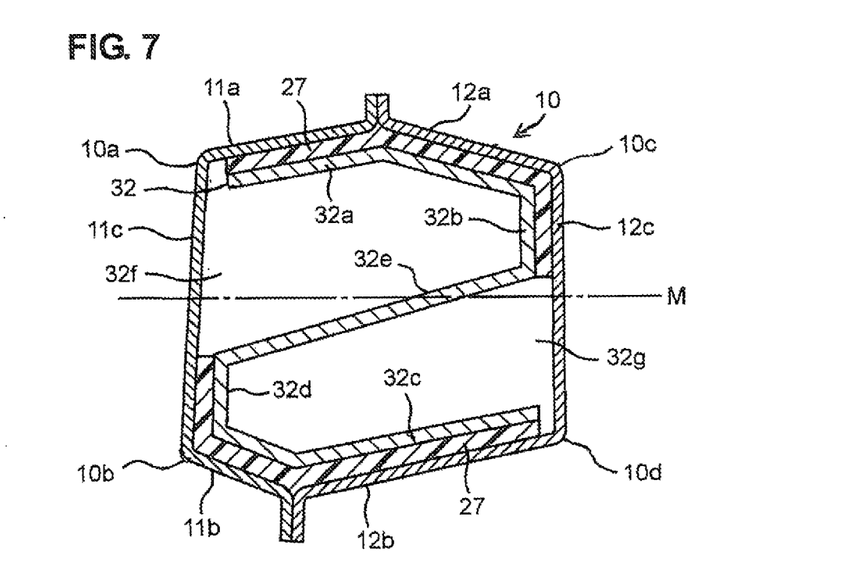
FIG. 7 is a sectional view of the side sill, taken along line Y7-Y7 of FIG. 1.
Figure 8:
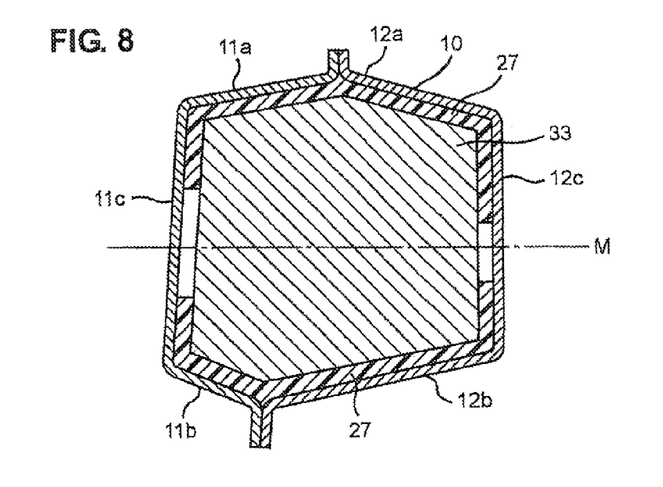
FIG. 8 is a sectional view of the side sill, taken along line Y8-Y8 of FIG. 1.

Hereinafter, a frame structure for a vehicle according to an embodiment of the present invention will be described. FIG. 1 is a perspective view showing a side sill to which a frame structure for a vehicle according to an embodiment of the present invention is applied. FIG. 2 is an exploded perspective view of the side sill show in FIG. 1. FIG. 3 is a perspective view showing a reinforcement body provided inside the side sill shown in FIG. 1. FIG. 4A is a sectional view of the reinforcement body shown in FIG. 3, taken along line Y4a-Y4a, and FIG. 4B is a sectional view of the reinforcement body shown in FIG. 3, taken along line Y4b-Y4b. FIG. 5 is a sectional view taken along line Y5-Y5 of FIG. 1. FIG. 6 is a sectional view of the side sill, taken along line Y6-Y6 of FIG. 1. FIG. 7 is a sectional view of the side sill, taken along line Y7-Y7 of FIG. 1. FIG. 8 is a sectional view of the side sill, taken along line Y8-Y8 of FIG. 1. In FIG. 2, an illustration of the reinforcement body provided inside the side sill is omitted.

As shown in FIG. 1, a side sill 1 to which the frame structure for a vehicle according to the embodiment of the present invention is applied, which is arranged at a lower portion of a vehicle body and extends in a vehicle longitudinal direction, is connected to a hinge pillar 20 at its front portion, and a reinforcement body 30 is provided inside at a connection portion 25 to the hinge pillar 20 and in the vicinity of this connection portion 25.

The side sill 1 comprises a frame body 10 which is formed to have a closed cross section, which includes a side sill inner 11 which constitutes part of an inner face of the vehicle body and extends in a vehicle longitudinal direction, and a side sill outer 12 which constitutes part of an outer face of the vehicle body and extends in the vehicle longitudinal direction.

Specifically, the side sill inner 11, as shown in FIG. 6, comprises an upper face portion 11a extending substantially horizontally, a lower face portion 11b extending substantially horizontally positioned below the upper face portion 11a, and a side face portion 11c extending substantially vertically from the lower face portion 11b to the upper face portion 11a. The side face portion 11c protrudes inwardly in the vehicle width direction (to the left side, i.e., toward a vehicle inside, in FIG. 6).

The side sill inner 11 further comprises an upper flange portion 11d which is formed at an outward end portion of the upper face portion 11a and extends upwardly and a lower flange portion 11e which is formed at an outward end portion of the lower face portion 11b and extends downwardly. The side sill inner 11 is formed to have a substantially U-shaped cross section.

Meanwhile, the side sill outer 12 comprises an upper face portion 12a extending substantially horizontally, a lower face portion 12b extending substantially horizontally positioned below the upper face portion 12a, and a side face portion 12c extending substantially vertically from the lower face portion 12b to the upper face portion 12a. The side face portion 12c protrudes outwardly in the vehicle width direction (to the right side, i.e., toward a vehicle outside, in FIG. 6).

The side sill outer 12 also comprises an upper flange portion 12d which is formed at an inward end portion of the upper face portion 12a and extends upwardly and a lower flange portion 12e which is formed at an inward end portion of the lower face portion 12b and extends downwardly. The side sill outer 12 is formed to have a substantially U-shaped cross section.

The side sill inner 11 and the side sill outer 12 are connected to each other at their upper flange portions 11d, 12d and their lower flange portions 11e, 12e, so that the frame body 10 is formed to have the closed cross section. Herein, the side sill inner 11 and the side sill outer 12 are formed through pressing of a metal-made plate member, such as a steel plate, respectively.

At this frame body 10 are provided a corner portion 10a formed between the upper face portion 11a and the side face portion 11c of the side sill inner 11, a corner portion 10b formed between the lower face portion 11b and the side face portion 11c of the side sill inner 11, a corner portion 10c formed between the upper face portion 12a and the side face portion 12c of the side sill outer 12, and a corner portion 10d formed between the lower face portion 12b and the side face portion 12c of the side sill outer 12. Thus, the frame body 10 is formed to have the substantially rectangular closed cross section.

As described above, the torsional load inputted to the vehicle body from the attachment portions of the suspension device of the wheels to the vehicle body during the vehicle traveling is transmitted to the side sill 1 having the frame body 10, so that the bending moment occurs in such a manner that its rotational-axis direction matches the vehicle width direction.

That is, the bending moment occurs at the frame body 10 when the torsional load acts on the vehicle body, and the frame body 10 comprises the side face portion 11c of the side sill inner 11 and the side face portion 12c of the side sill outer 12 which are provided away from each other and extend in the direction substantially perpendicular to the direction of the rotational axis M of the above-described bending moment, and the upper face portion 11a of the side sill inner 11, the upper face portion 12a of the side sill outer 12, the lower face portion 11b of the side sill inner 11, and the lower face portion 12b of the side sill outer 12 which are positioned between the side face portions 11c, 12c and form the corner portions 10a, 10c, 10b, 10d together with the side face portions 11c, 12c, respectively.

Hereinafter, the side face portion 11c of the side sill inner 11 will be referred to as a first face portion 11c of the frame body 10, the side face portion 12c of the side sill outer 12 will be referred to as a second face portion 12c of the frame body 10, the upper face portion 11a of the side sill inner 11 and the upper face portion 12a of the side sill outer 12 will be referred to as one of third face portion 11a, 12a, and the lower face portion 11b of the side sill inner 11 and the lower face portion 12b of the side sill outer 12 will be referred to as the other of third face portion 11b, 12b.

Herein, the first face portion 11c and the second face portion 12c of the frame body 10 correspond to the both side face portions which extend in the direction perpendicular to the vehicle width direction of the side sill 1, the first face portion 11c corresponds to the side face portion positioned on the vehicle inside, the second face portion 12c corresponds to the side face portion positioned on the vehicle outside, the both-side third face portions 11a, 12a, 11b, 12b of the frame body 10 correspond to the upper face and the lower face of the side sill 1, the one of third face portions: 11a, 12a correspond to the upper face portion, and the other of third face portions: 11b, 12b correspond to the lower face potion.

Further, the hinge pillar 20 connected to the side sill 1 is connected to a front pillar, not illustrated. The torsional load inputted to the vehicle body via the connection portions of the wheel suspension device to the vehicle body during the vehicle traveling is transmitted to the hinge pillar 20, and then this load is transmitted to the side sill via this hinge pillar 20.

The hinge pillar 20 is, as shown in FIG. 1, formed in a substantially L shape, when viewed from side, and formed by a hinge pillar outer 21 positioned on the vehicle outside and a hinge pillar inner 22 positioned on the vehicle inside to have a closed cross section.

Further, the hinge pillar 20 is configured such that a lower portion 22a of the hinge pillar inner 22 is arranged inside the side sill 1 at its connection portion 25 to the side sill 1, specifically, such that the lower portion 22a extends between the side sill inner 11 and the side sill outer 12 and the hinge pillar outer 21 is arranged on the vehicle outside of the side sill outer 12, as shown in FIGS. 2 and 5.

Thus, at the connection portion 25 of the side sill 1 and the hinge pillar 20, the hinge pillar inner 22 is provided to partition the closed cross section S1 formed by the side sill inner 11 and the side sill outer 12 into two spaces which are positioned on the vehicle outside and the vehicle inside. Thereby, a substantially rectangular closed cross section S2 is formed by the side sill inner 11 and the hinge pillar inner 22, while a substantially rectangular closed cross section S3 is formed by the side sill outer 12 and the hinge pillar inner 22.

Herein, as shown in FIGS. 2 and 5, the side face 12c of the side sill outer 12 is configured such that a vertical length of its front portion is shorter than that of the other part, and the closed cross section S3 is formed to have the closed cross section by, concretely, the side sill outer 12, the hinge pillar outer 21, and the hinge pillar inner 22.

In the present embodiment, a reinforcement body 30 is provided inside the frame body 10 to reinforce the frame body 10. The reinforcement body 30, as shown in FIG. 4, comprises a S-shaped portion 31 which is formed in a S shape in a section perpendicular to a longitudinal direction of the frame body 10, a reverse S-shaped portion 32 which is formed in a reverse-S shape in the section perpendicular to the longitudinal direction of the frame body 10, and a partition-wall portion 33 which extends in the sectional direction perpendicular to the longitudinal direction of the frame body 10, i.e., in the vehicle width direction.

As shown in FIGS. 4A and 6, the S-shaped portion 31 comprises a third-face connection portion (a first third-face connection portion) 31a which extends in the vehicle width direction along the one of third face portions 11a, 12a of the frame body 10 and is connected to these third face portions 11a, 12a via an adhesive 27, and a first-face connection portion (a first first-face connection portion) 31b which extends downwardly from an inward end portion of the third-face connection portion 31a along the first face portion 11c at the corner portion 10a of the frame body 10 and is continuous from the third-face connection portion 31a and connected to the first face portion 11c at the corner portion 10a of the frame body 10 via the adhesive 27.

The S-shaped portion 31 further comprises a third-face connection portion (a second third-face connection portion) 31e which extends in the vehicle width direction along the other of third face portions 11b, 12b of the frame body 10 and is connected to these third face portions 11b, 12b via the adhesive 27, and a second-face connection portion (a second second-face connection portion) 31d which extends upwardly from an outward end portion of the third-face connection portion 31e along the second face portion 12e at the corner portion 10d of the frame body 10 and is continuous from the third-face connection portion 31e and connected to the second face portion 12e at the corner portion 10d of the frame body 10 via the adhesive 27.

Further, the S-shaped portion 31 includes a first connection portion 31e which connects the first-face connection portion 31b and the second-face connection portion 31d. The first connection portion 31e slants downwardly as it extends from its vehicle-inside portion to its vehicle-outside portion such that the distance from the third-face connection portion 31a becomes greater, while the distance from the third-face connection portion 31e becomes smaller.

The S-shaped portion 31 further comprises a first-face non-contact portion 31f which is provided away from the first face portion 11c of the frame body 10 (i.e., does not contact the first face portion 11c of the frame body 10), and a second-face non-contact portion 31g which is provided away from the second face portion 12c of the frame body 10 (i.e., does not contact the second face portion 12c of the frame body 10).

Meanwhile, as shown in FIGS. 4B and 7, the reverse S-shaped portion 32 comprises a third-face connection portion (a first third-face connection portion) 32a which extends in the vehicle width direction along the one of third face portions 11a, 12a of the frame body 10 and is connected to these third face portions 11a, 12a via the adhesive 27, and a second-face connection portion (a first second-face connection portion) 32b which extends downwardly from an outward end portion of the third-face connection portion 32a along the second face portion 12c at the corner portion 10c of the frame body 10 and is continuous from the third-face connection portion 32a and connected to the second face portion 12c at the corner portion 10c of the frame body 10 via the adhesive 27.

The reverse S-shaped portion 32 further comprises a third-face connection portion (a second third-face connection portion) 32c which extends in the vehicle width direction along the other of third face portions 11b, 12b of the frame body 10 and is connected to these third face portions 11b, 12b via the adhesive 27, and a first-face connection portion (a second first-face connection portion) 32d which extends upwardly from an inward end portion of the third-face connection portion 32c along the first face portion 11c at the corner portion 10b of the frame body 10 and is continuous from the third-face connection portion 32c and connected to the first face portion 11c at the corner portion 10b of the frame body 10 via the adhesive 27.

Further, the reverse S-shaped portion 32 includes a second connection portion 32e which connects the first-face connection portion 32d and the second-face connection portion 32b. The second connection portion 32e slants downwardly as it extends from its vehicle-outside portion to its vehicle-inside portion such that the distance from the third-face connection portion 32a becomes greater, while the distance from the third-face connection portion 32c becomes smaller.

The reverse S-shaped portion 32 further comprises a first-face non-contact portion 32f which is provided away from the first face portion 11c of the frame body 10 (i.e., does not contact the first face portion 11c of the frame body 10), and a second-face non-contact portion 32g which is provided away from the second face portion 12c of the frame body 10 (i.e., does not contact the second face portion 12c of the frame body 10).

As shown in FIGS. 4A, 4B and 8, the partition-wall portion 33 has a contour corresponding to the shape of the inner face of the frame body 10 and extends in the sectional direction perpendicular to the longitudinal direction of the frame body 10. In FIGS. 4A, 4B, the S-shaped portion 31, the reverse S-shaped portion 32, and the partition-wall portion 33 are illustrated separately by two-dotted broken lines to show these portions clearly.

The reinforcement body 30 has plural S-shaped portions 31, reverse S-shaped portions 32, and partition-wall portions 33, and the S-shaped portions 31 and the reverse S-shaped portions 32 are arranged one after the other in the longitudinal direction of the frame body 10 via the partition-wall potions 33. The S-shaped portions 31, reverse S-shaped portions 32, and partition-wall portions 33 are formed integrally at the reinforcement body 30. Herein, the reinforcement body 30 may be formed through an injection molding or the like by using resin materials.

Thus, the plural first-face connection portions 31b, 32d of the reinforcement body 30 are provided away from each other in the longitudinal direction of the frame body 10, and the plural second-face connection portions 31d, 32b of the reinforcement body 30 are provided away from each other in the longitudinal direction of the frame body 10. Thereby, the increase of weight can be restrained, compared with a case in which the first-face connection portions 31b, 32d and the second-face connection portions 31d, 32b are provided continuously in the longitudinal direction of the frame body 10.

Further, the first first-face connection portion 31b and the second first-face connection portion 32d are provided not to overlap in the longitudinal direction of the frame body 10, and the first second-face connection portion 32b and the second second-face connection portion 31d are provided not to overlap in the longitudinal direction of the frame body 10.

Further, the reinforcement body 30 is configured such that the first-face connection portions 31b, 32d are not connected to the second face portion 12c of the frame body 10 in an area where the first-face connection portions 31b, 32d are projected to the second face portion 12c of the frame body 10 in the direction of the rotational axis M of the bending moment and the second-face connection portions 31d, 32b are not connected to the first face portion 11c of the frame body 10 in an area where the second-face connection portions 31d, 32b are projected to the first face portion 11c of the frame body 10 in the direction of the rotational axis M of the bending moment.

Moreover, the first connection portions 31e of the reinforcement body 30 is configured such that the distance between the first connection potion 31e and the first third-face connection portion 31a becomes greater toward the second face portion 12c from the first face portion 11c and the distance between the first connection potion 31e and the second third-face connection portion 31c becomes greater toward the first face portion 11c from the second face portion 12c, and the second connection portion 32e is configured such that the distance between the second connection potion 32e and the first third-face connection portion 32a becomes greater toward the first face portion 11c from the second face portion 12c and the distance between the second connection potion 32e and the second third-face connection portion 32c becomes greater toward the second face portion 12c from the first face portion 11c. Thereby, in a case in which the reinforcement body 30 is formed with a forming mold through the injection molding, for example, the mold removing can be conducted easily.

Herein, it is preferable that the first-face connection portions 31b, 32d adhere to the first face portion 11c so that the vertical length of the adhering portion thereof is ⅓ or longer of the vertical length of the first face portion 11c, while the second-face connection portions 31d, 32b be connected to the second face portion 12c so that the vertical length of the adhering portion thereof is ⅓ or longer of the vertical length of the first face portion 12c.

The reinforcement body 30, as shown in FIGS. 1 and 3, is further configured such that the length, in the vehicle width direction, of its front portion is so short that it can be arranged inside the closed cross section S3 positioned on the vehicle outside which is formed through partition by the hinge pillar inner 22 at the connection portion 25 of the side sill 1 and the hinge pillar 20.

Likewise, the reinforcement body 30 comprises, at its part provided on the vehicle front side, the S-shaped portion 31 formed in the S shape in the section perpendicular to the longitudinal direction of the frame body 10, the reverse S-shaped portion 32 formed in the reverse-S shape in the section perpendicular to the longitudinal direction of the frame body 10, and the plate-shaped partition-wall portion 33 extending in the sectional direction perpendicular to the longitudinal direction of the frame body 10, i.e., in the vehicle width direction, and the S-shaped portion 31 and the reverse S-shaped portion 32 are arranged one after the other in the longitudinal direction of the frame body 10 via the partition-wall potion 33.

FIG. 5 shows the reverse S-shaped portion 32 of the reinforcement body 30 which is provided inside the side sill 1 at the connection portion 25 to the hinge pillar 20. As shown in FIG. 5, at the above-described part of the reinforcement body 30 provided on the vehicle front side, the reverse S-shaped portion 32 comprises the third-face connection portion (the first third-face connection portion) 32a, the second-face connection portion (the first second-face connection portion)

32b, the third-face connection portion (the second third-face connection portion) 32c, the first-face connection portion (the second first-face connection portion) 32d, and the second connection portion 32e, and is formed in the reverse S-shaped shape in the section perpendicular to the longitudinal direction of the frame body 10.

However, the first third-face connection portion 32a is connected to the upper face portion 12a of the side sill outer 12, the first second-face connection portion 32b is connected to the side face portion 21c at the corner portion 10c between the upper face portion 12 and the side face portion 12c of the side sill outer 12, the second third-face connection portion 32c is connected to the lower face portion 21a of the hinge pillar outer 21, and the second first-face connection portion 32d is connected to the hinge pillar inner 22 at a corner portion between the lower face portion 21a of the hinge pillar outer 21 and the lower portion 22a of the hinge pillar inner 22.

Likewise, at the above-described part of the reinforcement body 30 provided on the vehicle front side, the S-shaped portion 31 is formed in the S shape in the section perpendicular to the longitudinal direction of the frame body 10 and the partition-wall portion 33 is formed to extend in the sectional direction perpendicular to the longitudinal direction of the frame body 10, i.e., in the vehicle width direction, in the closed cross section S3, illustration of which is omitted.

As described above, in the frame structure for a vehicle according to the present embodiment, the frame body 10 comprises the first face portion 11c and the second face portion 12c which are provided away from each other and extend in the direction substantially perpendicular to the direction of the rotational axis M of the bending moment which occurs at the frame body 10 when the torsional load acts on the vehicle body 10, and the third face portions 11a, 12a and 11b, 12b which are positioned between the first face portion 11c and the second face portion 12c and form the corner portions 10a, 10c and 10b, 10d together with the first face portion 11c and the second face portion 12c, respectively.

The reinforcement body 30 provided inside the frame body 10 comprises the third-face connection portions 31a, 32a and 31c, 32c which are provided along the both-side third face portions 11a, 12a and 11b, 12b of the frame body 10 and connected to these third face portions 11a, 12a and 11b, 12b, the first-face connection portions 31b, 32d which are provided continuously from the third-face connection portions 31a, 32c and connected to the first face portion 11c of the frame body 10 at the corner portions 10a and 10b between the third face portions 11a and 11b and the first face portion 11c, the first-face non-contact portions 31f, 32f which are provided away from the first face portion 11c of the frame body 10 (i.e., do not contact the first face portion 11c), the second-face connection portions 31d, 32b which are provided continuously from the third-face connection portions 31c, 32a and connected to the second face portion 12c of the frame body 10 at the corner portions 10d and 10c between the third face portions 12b and 12a and the second face portion 12c, and the second-face non-contact portions 31g, 32g which are provided away from the second face portion 12c of the frame body 10 (i.e., do not contact the second face portion 12c).

Accordingly, the both-side third face portions 11a, 12a and 11b, 12b positioned between the first face portion 11c and the second face portion 12c of the frame body 10 which extend in the direction substantially perpendicular to the direction of the rotational axis M of the bending moment occurring at the frame body 10 when the torsional load acts on the vehicle body, the vicinity of the corner potions 10a and 10b between the first face portion 11c and the third face portions 11a, 12a and 11b, 12b, and the vicinity of the corner portions 10c and 10b between the second face portion 12c and the third face portions 11a, 12a and 11b, 12b can be effectively reinforced. Accordingly, when the torsional rigidity acts on the vehicle body 10, the bending deformation of the frame body can be restrained and the torsional rigidity of the vehicle body 10 can be increased, restraining the weight increase.

Further, since the reinforcement body 30 comprises the S-shaped portion 31 which is formed in the S shape in the section perpendicular to the longitudinal direction of the frame body 10, the reverse S-shaped portion 32 which is formed in the reverse S shape in the section perpendicular to the longitudinal direction of the frame body 10, and the partition-wall portion 33 which extends in the sectional direction perpendicular to the longitudinal direction of the frame body 10, and the S-shaped portion 31 and the reverse S-shaped portion 32 are arranged one after the other in the longitudinal direction of the frame body 10 via the partition-wall potion 33, the bending deformation of the frame body 10 can be further restrained when the torsional load acts on the vehicle body, so that the above-described effects can be provided more effectively.

In the present embodiment, the first face portion 11c and the second face portion 12c of the frame body 10 constitute the both side face portions 11c, 12c extending in the direction perpendicular to the vehicle width direction of the side sill 1, and the both third face portions 11a, 12a and the 11b, 12b of the frame body 10 constitute the upper face portions 11a, 12a and the lower face portions 11b, 12b.

Thereby, the upper face portions 11a, 12a and the lower face portions 11b, 12b of the side sill 1, the vicinity of the corners 10a, 10c between the both side face portions 11c, 12c and the upper face portions 11a, 12a of the side sill 1, and the vicinity of the both side face portions 11c, 12c and the lower face portions 11b, 12b of the side sill 1 can be reinforced effectively, so that the bending deformation of the side sill 1 can be restrained when the torsional load acts on the vehicle body 10. Accordingly, the torsional rigidity of the vehicle body can be increased, restraining the weight increase.

Figure 9:
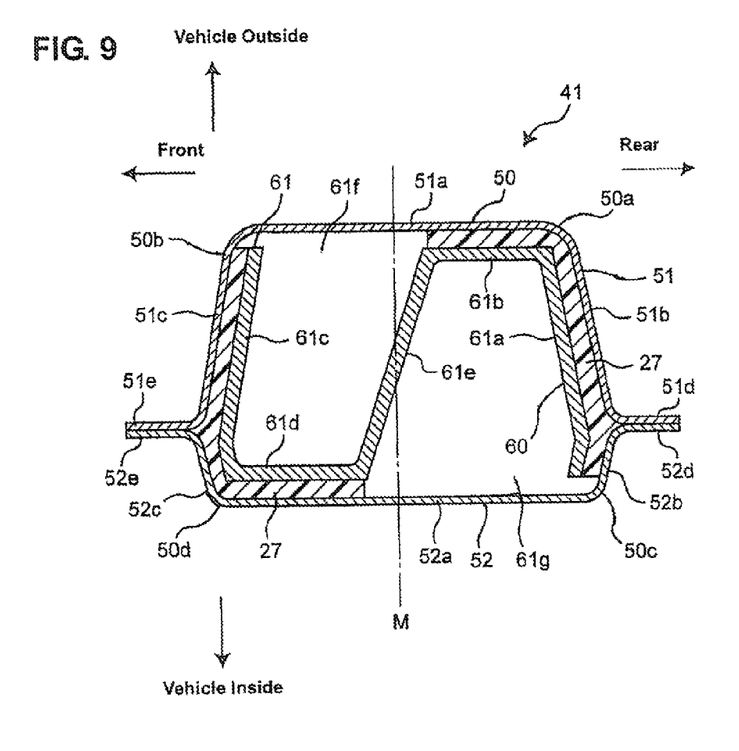
FIG. 9 is a sectional view of a pillar to which a frame structure for a vehicle according to another embodiment of the present invention is applied.

FIG. 9 is a sectional view of a pillar to which a frame structure for a vehicle according to another embodiment of the present invention is applied. A pillar 41, as the frame structure for a vehicle according to this embodiment of the present invention is applied, is connected to the side sill 1 and extends in a vertical direction of the vehicle body, and a reinforcement body 60 is provided inside the pillar 41 as shown in FIG. 9.

The pillar 41 comprises a frame body 50 which is formed to have a closed cross section, and the frame body 50 is formed to have the closed cross section by a pillar outer 51 which constitutes part of the outer face of the vehicle body and extends in the vertical direction of the vehicle body and a pillar inner 52 which constitutes part of the inner face of the vehicle body and extends in the vertical direction of the vehicle body.

The pillar outer 51 comprises a bottom face portion 51a and both side face portions, specifically, a side (rear) face portion 51b positioned on the vehicle rear side and a side (front) face portion 51c positioned on the vehicle front side, and flange portions 51d, 51e which extend from the side face portions 51b, 51c, and is formed to have a U-shaped cross section. The pillar inner 52 also includes a bottom face portion 52a and both side face portions, specifically, a side (rear) face portion 52b positioned on the vehicle rear side and a side (front) face portion 52c positioned on the vehicle front side, and flange portions 52d, 52e which extend from the side face portions 52b, 52c, and is formed to have a U-shaped cross section. The pillar outer 51 and the pillar inner 52 are connected to each other at the flange portions 51d, 52d, 51e, 52e of the pillar outer 51 and the pillar inner 52. Thus, the pillar 41 is formed to have the substantially-rectangular closed cross section.

Likewise, the torsional load inputted to the vehicle body from the attachment portions of the suspension device of the wheels to the vehicle body during the vehicle raveling is transmitted to the pillar 41 in the present embodiment, so that the bending moment occurs in such a manner that the direction of the rotational axis M matches the vehicle width direction.

That is, the bending moment occurs at the frame body 50 when the torsional load acts on the vehicle body, and the frame body 50 comprises the bottom face portion 51a of the pillar outer 51 and the bottom face portion 52a of the pillar inner 52 which are provided away from each other and extend in the direction substantially perpendicular to the direction of the rotational axis M of the above-described bending moment, and the side face portion 51b of the pillar outer 51, the side face portion 52b of the pillar inner 52, the side face portion 51c of the pillar outer 51, and the side face portion 52c of the pillar inner 52 which are positioned between the bottom face portions 51a, 52b and form corner portions 50a, 50b, 50c, 50d together with the bottom face portions 51a, 52a, respectively.

Hereinafter, the bottom face portion 51a of the pillar outer 51 will be referred to as a first face portion 51a of the frame body 50, the bottom face portion 52a of the pillar inner 52 will be referred to as a second face portion 52a of the frame body 50, the side face portion 51b of the pillar outer 51 and the side face portion 52b of the pillar inner 52 will be referred to as one of third face portion: 51b, 52b, and the side face portion 51c of the pillar outer 51 and the side face portion 52c of the pillar inner 52 will be referred to as the other of third face portion: 51c, 52c.

According to the pillar 41, similarly to the reinforcement body 30, the reinforcement body 60 comprises third-face connection portions which are provided along the both-side third face portions 51b, 52b and 51c, 52c of the frame body 50 and connected to these third face portions 51b, 52b and 51c, 52c, a first-face connection portion which is provided continuously from the third-face connection portions and connected to the first face portion 51a of the frame body 50 at the corner portion 50a, a first-face non-contact portion which is provided away from the first face portion 51a of the frame body 50 (i.e., does not contact the first face portion 51a), a second-face connection portion which is provided continuously from the third-face connection portions and connected to the second face portion 52a of the frame body 50 at the corner portion 50d, and a second-face non-contact portion which is provided away from the second face portion 52a of the frame body 50 (i.e., does not contact the second face portion 52a).

Further, the reinforcement body 60 comprises a S-shaped portion 61 which is formed in the S shape in the section perpendicular to the longitudinal direction of the frame body 50, a reverse S-shaped portion which is formed in a reverse S shape in the section perpendicular to the longitudinal direction of the frame body 50, and a partition-wall portion which extends in the sectional direction perpendicular to the longitudinal direction of the frame body 50, and the S-shaped portion 61 and the reverse S-shaped portion are arranged one after the other in the longitudinal direction of the frame body 50 via the partition-wall potion.

As shown in FIG. 9 which shows the S-shaped portion 61 of the reinforcement body 60, the S-shaped portion 61 comprises a third-face connection portion (a first third-face connection portion) 61a which is connected to one of third face portions 51b, 52b of the frame body 50 via an adhesive 27, and a first-face connection portion (a first first-face connection portion) 61b which is continuous from the third-face connection portion 61a and connected to the first face portion 51a at the corner portion 50a of the frame body 50 via the adhesive 27.

The S-shaped portion 61 further comprises a third-face connection portion (a second third-face connection portion) 61c which is connected to the other of third face portions 51c, 52c of the frame body 50 via the adhesive 27, and a second-face connection portion (a second second-face connection portion) 61d which is continuous from the third-face connection portion 61c and connected to the second face portion 52c at the corner portion 50d of the frame body 50 via the adhesive 27.

Further, the S-shaped portion 61 includes a first connection portion 61e which connects the first-face connection portion 61b and the second-face connection portion 61d. The first connection portion 61e slants forwardly as it extends from its vehicle-outside portion to its vehicle-inside portion such that the distance from the third-face connection portion 61a becomes greater, while the distance from the third-face connection portion 61c becomes smaller.

The S-shaped portion 61 further comprises a first-face non-contact portion 61f which is provided away from the first face portion 51a of the frame body 50 (i.e., does not contact the first face portion 51a of the frame body 50), and a second-face non-contact portion 61g which is provided away from the second face portion 52a of the frame body 50 (i.e., does not contact the second face portion 52a of the frame body 50).

Meanwhile, the reverse S-shaped portion of the reinforcement body 60, which is not illustrated here, comprises a third-face connection portion (a first third-face connection portion) which is connected to the one of third face portions 51b, 52b of the frame body 50 via the adhesive 27, and a second-face connection portion (a first second-face connection portion) which is continuous from the third-face connection portion and connected to the second face portion 52a at the corner portion 50c of the frame body 50 via the adhesive 27.

The reverse S-shaped portion further comprises a third-face connection portion (a second third-face connection portion) which is connected to the other of third face portions 51c, 52c of the frame body 50 via the adhesive 27, and a first-face connection portion (a second first-face connection portion) which is continuous from the third-face connection portion and connected to the first face portion 51a at the corner portion 50b of the frame body 50 via the adhesive 27.

Further, the reverse S-shaped portion includes a second connection portion which connects the first-face connection portion and the second-face connection portion. The second connection portion slants rearwardly as it extends from its vehicle-outside portion to its vehicle-inside portion such that the distance from the first third-face connection portion becomes greater, while the distance from the second third-face connection portion becomes smaller.

The reverse S-shaped portion further comprises a first-face non-contact portion which is provided away from the first face portion 51a of the frame body 50 (i.e., does not contact the first-face portion 51a of the frame body 50), and a second-face non-contact portion which is provided away from the second face portion 52a of the frame body 50 (i.e., does not contact the second face portion 52a of the frame body 50).

Moreover, the partition-wall portion of the reinforcement body 60, which is not illustrated, has a contour which corresponds to a shape of an inner face of the frame body 50, and extends in the sectional direction perpendicular to the longitudinal direction of the frame body 50.

As described above, in the pillar 41 to which the frame structure for a vehicle according to the present embodiment is applied as well, the frame body 50 comprises the first face portion 51*a* and the second face portion 52*a* which are provided away from each other and extend in the direction substantially perpendicular to the direction of the rotational axis M of the bending moment which occurs at the frame body 50 when the torsional load acts on the vehicle body 50, and the third face portions 51*b*, 52*b* and 51*c*, 52*c* which are positioned between the first face portion 51*a* and the second face portion 52*a* and form the corner portions 50*a*, 50*c* and 50*b*, 50*d* together with the first face portion 51*a* and the second face portion 52*a*, respectively.

The reinforcement body 60 provided inside the frame body 50 comprises the third-face connection portions 61*a*, 61*c* which are provided along the both-side third face portions 51*b*, 52*b* and 51*c*, 52*c* of the frame body 50 and connected to these third face portions 51*b*, 52*a* and 51*c*, 52*c*, the first-face connection portion 61*b* which is provided continuously from the third-face connection portions 61*a* and connected to the first face portion 51*a* of the frame body 50 at the corner portion 50*a* between the third face portion 51*b* and the first face portion 51*a*, the first-face non-contact portions 61*f* which is provided away from the first face portion 51*a* of the frame body 50 (i.e., does not contact the first face portion 51*a*), the second-face connection portions 61*d* which is provided continuously from the third-face connection portion 61*c* and connected to the second face portion 52*a* of the frame body 50 at the corner portion 50*d* between the third face portion 52*c* and the second face portion 52*a*, and the second-face non-contact portion 61*g* which is provided away from the second face portion 52*a* of the frame body 50 (i.e., does not contact the second face portion 52*a*.

Accordingly, the both-side third face portions 51*b*, 52*b* and 51*c*, 52*c* positioned between the first face portion 51*a* and the second face portion 52*a* of the frame body 50 which extend in the direction substantially perpendicular to the direction of the rotational axis M of the bending moment occurring at the frame body 50 when the torsional load acts on the vehicle body, the vicinity of the corner potions 50*a* and 50*b* between the first face portion 51*a* and the third face portions 51*b* and 51*c*, and the vicinity of the corner portions 50*c* and 50*d* between the second face portion 52*a* and the third face portions 52*b* and 52*c* can be effectively reinforced. Accordingly, when the torsional rigidity acts on the vehicle body 50, the bending deformation of the frame body can be restrained and the torsional rigidity of the vehicle body 50 can be increased, restraining the weight increase.

Further, since the reinforcement body 60 comprises the S-shaped portion 61 which is formed in the S shape in the section perpendicular to the longitudinal direction of the frame body 50, the reverse S-shaped portion which is formed in the reverse S shape in the section perpendicular to the longitudinal direction of the frame body 50, and the partition-wall portion which extends in the sectional direction perpendicular to the longitudinal direction of the frame body 50, and the S-shaped portion and the reverse S-shaped portion are arranged one after the other in the longitudinal direction of the frame body 50 via the partition-wall potion, the bending deformation of the frame body 50 can be further restrained when the torsional load acts on the vehicle body, so that the above-described effects can be provided more effectively.

The present invention should not be limited to the above-described embodiments, and any other modifications and improvements may be applied within the scope of a sprit of the present invention.

What is claimed is:

1. A frame structure for a vehicle, comprising:
   a frame body formed to have a closed cross section; and
   a reinforcement body provided inside the frame body to reinforce the frame body,
   wherein said frame body comprises a first face portion and a second face portion which are provided away from each other and extend in a direction substantially perpendicular to a rotational-axis direction of a bending moment which occurs at the frame body when a torsional load acts on the vehicle body, and a pair of third face portions which are positioned between the first face portion and the second face portion and form corner portions together with the first face portion and the second face portion, respectively, and
   said reinforcement body comprises plural sets of portions, each set of which includes a S-shaped portion, a reverse S-shaped portion, and a partition-wall portion,
   the S-shaped portion being formed by a first third-face connection portion which is connected to one of the third face portions of the frame body, a first-face connection portion which is connected to the first face portion of the frame body at the corner portion between said one of the third face portions and the first face portion of the frame body, a second third-face connection portion which is connected to the other of the third face portions of the frame body, a second-face connection portion which is connected to the second face portion of the frame body at the corner portion between the other of the third face portions and the second face portion of the frame body, and a connection portion connecting said first-face connection portion and said second-face connection portion, in a S shape in a section perpendicular to a longitudinal direction of the frame body,
   the reverse S-shaped portion being formed by another first third-face connection portion which is connected to said one of the third face portions of the frame body, another second-face connection portion which is connected to the second face portion of the frame body at the corner portion between said one of the third face portions and the second face portion of the frame body, another second third-face connection portion which is connected to said other of the third face portions of the frame body, another first-face connection portion which is connected to the first face portion of the frame body at the corner portion between said other of the third face portions and the first face portion of the frame body, and another connection portion connecting said another second-face connection portion and said another first-face connection portion of the reverse S-shaped portion, in a reverse-S shape in the section perpendicular to the longitudinal direction of the frame body,
   the partition-wall portion being formed to extend in a sectional direction perpendicular to the longitudinal direction of the frame body,
   said reinforcement body comprising the plural sets of the S-shaped portions, the reverse S-shaped portions, and the partition-wall portions being provided inside said frame body such that each of said S-shaped portions and each of said reverse S-shaped portions are arranged one after the other in the longitudinal direction of the frame body via each of said partition-wall potions, whereby connection areas where the first-face connection portions of the reinforcement body are connected to the first face portion of the frame body are staggered and also other connection areas where the second-face connection portions of the reinforcement body are connected to the second face portion of the frame body are staggered.

2. The frame structure for a vehicle of claim 1, wherein said connection portion of the S-shaped portion is configured such that a distance between the connection potion of the S-shaped portion and said first third-face connection portion of the S-shaped portion becomes greater toward the second face portion from the first face portion of the frame body and a distance between the connection potion of the S-shaped portion and said second third-face connection portion of the S-shaped portion becomes greater toward the first face portion from the second face portion of the frame body, and said connection portion of the reverse S-shaped portion is configured such that a distance between the connection potion of the reverse S-shaped portion and the first third-face connection portion of the reverse S-shaped portion becomes greater toward the first face portion from the second face portion of the frame body and a distance between the connection potion of the reverse S-shaped portion and said second third-face connection portion of the reverse S-shaped portion becomes greater toward the second face portion from the first face portion of the frame body.

3. The frame structure for a vehicle of claim 1, wherein said frame structure constitutes a side sill which is provided to extend in a longitudinal direction of the vehicle body, said first face portion and said second face portion of the frame body constitute both side face portions which extend in a direction perpendicular to a vehicle width direction of the side sill, and said third face portions of the frame body constitute an upper face portion and a lower face potion of the side sill.

4. The frame structure for a vehicle of claim 1, wherein said frame structure constitutes a pillar which is provided to extend in a vertical direction of the vehicle body, said first face portion and said second face portion of the frame body constitute both side face portions which extend in a direction perpendicular to a vehicle width direction of the pillar, and said third face portions of the frame body constitute a front face portion and a rear face potion of the pillar.

* * * * *